United States Patent
Browning et al.

(10) Patent No.: US 9,710,813 B2
(45) Date of Patent: *Jul. 18, 2017

(54) SYSTEM AND METHOD FOR PROVIDING RECOVERY FOR VICTIMS OF CHECK FRAUD

(71) Applicant: EZShield, Inc., Baltimore, MD (US)

(72) Inventors: John C. Browning, Fallston, MD (US); Ken Illingworth, Abingdon, MD (US); Brian D. Briggs, Forest Hill, MD (US)

(73) Assignee: EZShield, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/297,596

(22) Filed: Jun. 5, 2014

(65) Prior Publication Data

US 2014/0289123 A1  Sep. 25, 2014

Related U.S. Application Data

(63) Continuation of application No. 11/328,362, filed on Jan. 9, 2006, now Pat. No. 8,788,377, which is a (Continued)

(51) Int. Cl.
*G06Q 40/00* (2012.01)
*G06Q 50/00* (2012.01)
(Continued)

(52) U.S. Cl.
CPC ....... *G06Q 20/4016* (2013.01); *G06Q 20/042* (2013.01); *G06Q 30/02* (2013.01)

(58) Field of Classification Search
CPC ... G06Q 20/4016; G06Q 20/042; G06Q 30/02
See application file for complete search history.

(56) References Cited

U.S. PATENT DOCUMENTS

| 4,634,148 A | 1/1987 | Greene |
| 5,093,787 A | 3/1992 | Simmons |

(Continued)

FOREIGN PATENT DOCUMENTS

| KR | 20-0343332 | 3/2004 |

OTHER PUBLICATIONS

"A Crook Has Drained Your Account. Who Pays?", FDIC Consumer News—Spring 1998, 2 Pages, Available at http://www.fdic.gov/consumers/consumer/news/cnsprg98/crook.html.

(Continued)

*Primary Examiner* — Mary Cheung
(74) *Attorney, Agent, or Firm* — Nixon Peabody LLP (57) ABSTRACT

A method for a consumer or business to protect against loss associated with specified forms of check fraud. Upon purchasing checks, a consumer or business can subscribe to a check fraud protection program, for an additional fee. A consumer or business may purchase Check Fraud Protection for an additional fee independent of purchasing checks. The subscription will enable the consumer or business to obtain reimbursement from the service provider for the consumer's losses due to specified causes. The consumer or business reciprocally assigns any right of recovery from the consumer's or business's bank or financial institution to the service provider, which can then seek reimbursement from the bank, or financial institution and institute proceedings against the fraud perpetrator. Protection may be obtained for forged signatures, forged endorsements and altered check. A symbol to indicate such protection is also disclosed.

23 Claims, 5 Drawing Sheets

Related U.S. Application Data continuation-in-part of application No. 10/685,206, filed on Oct. 14, 2003, now Pat. No. 8,346,637.

(60) Provisional application No. 60/418,936, filed on Oct. 15, 2002.

(51) Int. Cl.
    *G06Q 20/40*     (2012.01)
    *G06Q 20/04*     (2012.01)
    *G06Q 30/02*     (2012.01)

(56) References Cited

U.S. PATENT DOCUMENTS

| | | |
|---|---|---|
| 5,267,753 A | 12/1993 | Chock |
| 5,326,136 A | 7/1994 | Doyle |
| 5,649,099 A | 7/1997 | Theimer et al. |
| 5,863,074 A | 1/1999 | Wilkinson |
| 5,936,219 A | 8/1999 | Yoshida et al. |
| 5,940,844 A | 8/1999 | Cahill et al. |
| 6,073,121 A | 6/2000 | Ramzy |
| 6,086,708 A | 7/2000 | Colgate, Jr. |
| 6,181,814 B1 | 1/2001 | Carney |
| 6,390,362 B1 | 5/2002 | Martin |
| 6,766,301 B1 | 7/2004 | Daniel et al. |
| 6,957,770 B1 | 10/2005 | Robinson |
| 6,978,927 B2 | 12/2005 | Latimer et al. |
| 7,040,539 B1 | 5/2006 | Stover |
| 7,201,323 B2 | 4/2007 | Kotovich et al. |
| 7,263,506 B2 | 8/2007 | Lee et al. |
| 7,366,339 B2 | 4/2008 | Douglas et al. |
| 7,739,499 B2 | 6/2010 | Ramirez et al. |
| 8,032,453 B2 | 10/2011 | Ahuja et al. |
| 8,346,637 B2 | 1/2013 | Browning et al. |
| 8,788,377 B2 | 7/2014 | Browning et al. |
| 2002/0029194 A1 | 3/2002 | Lewis et al. |
| 2002/0032648 A1 | 3/2002 | Pine et al. |
| 2002/0062438 A1 | 5/2002 | Asay et al. |
| 2002/0067827 A1 | 6/2002 | Kargman |
| 2002/0184152 A1 | 12/2002 | Martin |
| 2003/0050891 A1 | 3/2003 | Cohen |
| 2003/0105710 A1 | 6/2003 | Barbara et al. |
| 2003/0112942 A1 | 6/2003 | Brown et al. |
| 2003/0219122 A1 | 11/2003 | Ramirez et al. |
| 2004/0010466 A1 | 1/2004 | Anderson |
| 2006/0145469 A1 | 7/2006 | Lubrino et al. |
| 2006/0202012 A1 | 9/2006 | Grano et al. |
| 2006/0213980 A1 | 9/2006 | Geller et al. |
| 2007/0174448 A1 | 7/2007 | Ahuja et al. |
| 2007/0250440 A1 | 10/2007 | Paulsen et al. |
| 2010/0106611 A1 | 4/2010 | Paulsen et al. |
| 2011/0307275 A1 | 12/2011 | Subin et al. |
| 2013/0110725 A1 | 5/2013 | Browning et al. |
| 2013/0211984 A1 | 8/2013 | Browning et al. |
| 2014/0122330 A1 | 5/2014 | Bruck et al. |
| 2014/0289123 A1 | 9/2014 | Browning et al. |

OTHER PUBLICATIONS

"Check Fraud: A Guide to Avoiding Losses", The Check Fraud Working Group, a Sub-Group of the Interagency Bank Fraud Working Group, Feb. 1999, 23 pages, Available online at http://occ.gov/publications/publications-by-type/other-publications-reports/pub-other-check-fraud.pdf.
"Enforcement of New Law Boosts Bad-check Recoveries," Arizona Daily Star, Tucson, Ariz.: Nov. 5, 1995, p. 3B, 3 pages.
"The United States Treasury Check Forgery Insurance Fund", National Client Protection Organization (NCPO), Available online at http://www.ncpo.org/mem/pubs/chkforg.htm Accessed Dec. 26, 2014, 3 pages.
Brooks, A., "Hiring a Consultant to Do Battle When a Medical Bill Seems Unfair", The New York Times, Nov. 14, 1996 (Reprinted Sep. 17, 2014), 4 pages.
Definition of "database," from the Computer Glossary: The Complete Illustrated Dictionary, Eighth Edition, Copyright 1998, p. 90.
Gallagher, J. "St. Louis Post-Dispatch Personal Finance Column," St. Louis Post-Dispatch, Jul. 20, 1996, 3 pages.
Gamble, R., "Breaking Up Over Fraud", Treasury & Risk Management Magazine, Nov.-Dec. 1998, Available online at: http://www.fraudtips.net/trearisk.htm.
"Cheque"—Definition, Available online at http://en.wikipedia.org/wiki/Cheque, printed Oct. 3, 2013, 22 pages.
"Credit Card"—Definition, Available online at http://en.wikipedia.org/wiki/Credit_card, printed Oct. 3, 2013, 24 pages.
"Negotiable Instrument"—Definition, Available online at http://en.wikipedia.org/wiki/Negotiable_Instrument, printed Oct. 3, 2013, 8 pages.
"How VISA Transactions Work", Available online at http://usa.visa.com/merchants/new-acceptance/how-visa-transactions-work.html, printed Oct. 3, 2013, 1 page.
"How a Credit Card Is Procesed", Available online at http://www.creditcards.com/credit-card-news/assets/HowACreditCardIsProcessed.pdf, printed Oct. 3, 2013, 5 pages.
Uniform Commercial Code (U.C.C.) Section 2-206: Offer and Acceptance in Formation of Contract, Available online at http://www.law.cornell.edu/ucc/2/2-206, printed Oct. 3, 2013, 2 pages.
Uniform Commercial Code (U.C.C.) Section 3-104: Negotiable Instrument, Available online at http://law.cornell.edu/ucc/3/3-104, printed Oct. 3, 2013, 2 pages.
Paymaster Technologies, Inc., Testimonials, Jul. 2, 2007, 2 pages, Source: http://web.archive.org/web/20010728131650/ & http://www.paymastertech.com/test.html.
Rumbach, D. "Forum Tackles Issue of Identity Theft; Guard Your Numbers and Check Your Statements, Experts Warn," South Bend Tribune, South Bend, Ind.:Jul. 26, 2002. p. 1, 3 pages.
Sherfield, C. "Take Steps to Ward Off Those Who Steal Funds for Presents," Nashville Banner, Dec. 18, 1997, 2 pages.
Werbeck, R., "Bad-check Writer Gets 8-year Term Still has to Face Charges in 4 More Counties, 2 states:[Final Edition]," The Journal Gazette. Journal-Gazette. Ft. Wayne, Ind.: Oct. 30, 2001. p. 1A, 3 pages.
Office Action in U.S. Appl. No. 10/685,206, mailed Jul. 13, 2007.
Office Action in U.S. Appl. No. 10/685,206, mailed Sep. 3, 2008.
Office Action in U.S. Appl. No. 10/685,206, mailed Dec. 7, 2009.
Office Action in U.S. Appl. No. 10/685,206, mailed Aug. 9, 2010.
Office Action in U.S. Appl. No. 10/685,206, mailed Nov. 10, 2011.
Office Action in U.S. Appl. No. 10/685,206, mailed May 18, 2012.
Notice of Allowance in U.S. Appl. No. 10/685,206, mailed Oct. 9, 2012.
Amendment in U.S. Appl. No. 10/685,206, mailed on Jun. 7, 2010.
Amendment in U.S. Appl. No. 10/685,206, mailed on Sep. 30, 2009.
Amendment in U.S. Appl. No. 10/685,206, mailed on Jan. 14, 2008.
Examiner Interview Summary Record in U.S. Appl. No. 10/685,206, mailed on Dec. 17, 2007.
Office Action in U.S. Appl. No. 11/328,362, mailed Mar. 17, 2008.
Office Action in U.S. Appl. No. 11/328,362, mailed Dec. 8, 2008.
Office Action in U.S. Appl. No. 11/328,362, mailed May 3, 2011.
Office Action in U.S. Appl. No. 11/328,362, mailed Oct. 4, 2012.
Office Action in U.S. Appl. No. 11/328,362, mailed on Jun. 13, 2013.
Notice of Allowance in U.S. Appl. No. 11/328,362, mailed Mar. 6, 2014.
Examiner Initiated Interview Summary in U.S. Appl. No. 11/328,362, mailed on Mar. 6, 2014.
Examiner Interview Summary Record in U.S. Appl. No. 11/328,362, mailed on Oct. 21, 2008.
Applicant Summary of Interview with Examiner in U.S. Appl. No. 11/328,362, mailed on Oct. 29, 2008.
Amendment in U.S. Appl. No. 11/328,362, mailed on Dec. 30, 2009.
Amendment in U.S. Appl. No. 11/328,362, mailed on Sep. 10, 2008.
Office Action in U.S. Appl. No. 13/720,921, mailed Oct. 30, 2013.
Office Action in U.S. Appl. No. 13/720,921, mailed Mar. 4, 2014.
Office Action in U.S. Appl. No. 13/720,921, mailed Oct. 2, 2014.
Office Action in U.S. Appl. No. 13/720,950, mailed Mar. 29, 2013.
Office Action in U.S. Appl. No. 13/720,950, mailed Oct. 29, 2013.
Office Action in U.S. Appl. No. 13/720,950, mailed Mar. 6, 2014.

(56) References Cited

OTHER PUBLICATIONS

Office Action in U.S. Appl. No. 13/720,950, mailed Dec. 26, 2014.
Office Action in U.S. Appl. No. 13/841,693, mailed Jul. 11, 2014.
Office Action in U.S. Appl. No. 13/841,693, mailed Jan. 29, 2015.
Canadian Office Action in Canadian Application No. 2,437,875, mailed Aug. 8, 2012.
Amendment and Response to Office Action in Canadian Application Serial No. 2,437,875, filed Jan. 25, 2013.
Trademark Application Serial No. 76/332,174 for EZ & Shield Design Application for "check fraud protection services marketed to individual consumers," filed Oct. 31, 2001, 7 pages.
Trademark Application Serial No. 76/347,371 for EZ EZShield & Shield Design Application for "check fraud protection services," filed Dec. 11, 2001, 8 pages.
Trademark Application Serial No. 76/422,686 for EZ EZShield Check Fraud Protection Program Application for "check fraud protection services," filed Jun. 17, 2002, 6 pages.
Amendment to Delete Use Claim in Trademark Application Serial No. 76/347,371, filed May 31, 2002, 4 pages.
Statement of Use With Corrected Date of First Use in Trademark Application Serial No. 76/347,371, filed Oct. 7, 2004, 6 pages.
Petition for Covered Business Method Patent Review of U.S. Pat. No. 8,346,637 under 35 U.S.C. § 321, 37 C.F.R. § 42.304, case CBM2013-00016, filed Apr. 23, 2013, without exhibits.
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1001 ("U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 1-50 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 51-100 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 101-150 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 151-200 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 201-250 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 251-300 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 301-338 of Exhibit Harland 1002 ("File History for U.S. Pat. No. 8,346,637").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1003 ("'Insurance Against Check Forgery,' E. Allan Farnsworth").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1004 ("Declaration of Michael D. Floyd").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1005 ("Declaration of Michael K. Harris").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1006 ("U.S. Publication No. 2004/0010466 to Anderson").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1007 ("U.S. Publication No. 2002/0032648 to Pine").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1008 ("Complaint filed in *EZShield, Inc.* v. *Harland Clarke Corp.*, No. 1:13-CV-00001 (GLR) (E.D. Tex)").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1009 ("Transitional Program for Covered Business Method Patents—Definitions of Covered Business Method Patent and Technological Invention, 77 Fed. Reg. 157 (Aug. 14, 2012)").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 1-50 of Exhibit Harland 1010 ("A Guide to the Legislative History of the America Invents Act; Part II of II, 21 Fed. Cir. Bar J. No. 4").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 51-100 of Exhibit Harland 1010 ("A Guide to the Legislative History of the America Invents Act; Part II of II, 21 Fed. Cir. Bar J. No. 4").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 101-115 of Exhibit Harland 1010 ("A Guide to the Legislative History of the America Invents Act; Part II of II, 21 Fed. Cir. Bar J. No. 4").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 1-50 of Exhibit Harland 1011 ("File History for U.S. Appl. No. 11/328,362").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 51-100 of Exhibit Harland 1011 ("File History for U.S. Appl. No. 11/328,362").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 101-150 of Exhibit Harland 1011 ("File History for U.S. Appl. No. 11/328,362").
Petition for Covered Business Method Patent Review of U.S. Pat. No. 8,346,637 under 35 U.S.C. § 321, 37 C.F.R. § 42.304, case CBM2013-00016, filed Apr. 23, 2013, pp. 151-198 of Exhibit Harland 1011 ("File History for U.S. Appl. No. 11/328,362").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1012 ("*SAP* v. *Versata*, Case No. CBM2012-00001, Decision (PTAB 2013)").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1013 ("Definition of "database" from Fourth Edition of the American Heritage College Dictionary").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1014 ("Definition of "check" from Fourth Edition of the American Heritage College Dictionary").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1015 ("Definition of "check" from Black Law's Dictionary, 1999").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1016 ("Definition of "printing" from Fourth Edition of the American Heritage College Dictionary").
Petition for Covered Business Method Patent Review of U.S. Pat. No. 8,346,637 under 35 U.S.C. § 321, 37 C.F.R. § 42.304, case (56) References Cited

OTHER PUBLICATIONS

CBM2013-00016, filed Apr. 23, 2013, Exhibit Harland 1017 ("Definition of "writing" from Black Law's Dictionary, 1999").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1018 ("Interim Guidance for Determining Subject Matter Eligibility for Process Claims in View of *Bilski* v. *Kappos* (Jul. 27, 2010)").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1019 ("U.S. Pat. No. 6,181,814 to James F. Carney").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1020 ("DesignerChecks.com, Index").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1021 ("DesignerChecks.com, Reorder").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1022 (DesignerChecks.com, Security).
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1023 ("DesignerChecks.com, AMOCA").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1024 ("Identity Theft: The Crime of the New Millennium" by Sean B. Hoar, Mar. 2001).
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1025 ("U.S. Pat. No. 5,863,074 to Rudolph P. Wilkinson").
Petition for Covered Business Method Patent Review of U.S. Pat. No. 8,346,637 under 35 U.S.C. § 321, 37 C.F.R. § 42.304, case CBM2013-00016, filed Apr. 23, 2013, Exhibit Harland 1026 ("*Liberty Mutual Ins.* v. *Progressive Casualty Ins.*, Case No. CBM-2012-00003, Order (Redundant Grounds) at 12 (PTAB 2013)").
Notice of Filing Date Accorded to Petition for Covered Business Method Patent Review of U.S. Pat. No. 8,346,637 under 35 U.S.C. § 321, 37 C.F.R. § 42.304, case CBM2013-00016, mailed Apr. 30, 2013.
Order: Conduct of the Proceeding 37 C.F.R. § 42.5; *Harland Clarke Corp.* v. *EZShield, Inc.*; Case CBM2013-00016; U.S. Pat. No. 8,346,637, entered Sep. 30, 2013.
Civil Action—1:13-cv-00001-GLR, "Complaint for Patent Infringement," (Attachments: Exhibit A), Filed on Jan. 1, 2013, 16 pages.
Civil Action—1:13-cv-00001-GLR, "Harland Clarke Corp.'s Answer, Affirmative Defenses & Counterclaims to EZShield, Inc.'s Complaint," Filed on Jan. 23, 2013, 13 pages.
Civil Action—1:13-cv-00001-MJG, "EZShield's Motion to Dismiss Counterclaims & Strike Affirmative Defenses (Attachments: #1 Memorandum in Support of Plaintiff EZShield, Inc.'s Motion to Dismiss Counterclaims and Strike Affirmative Defenses, #2 Declaration of Christopher C. Campbell in Support of Plaintiff EZShield, Inc.'s Motion to Dismiss Counterclaims and Strike Affirmative Defenses, #3 Exhibit A)," Filed Feb. 19, 2013, 52 pages.
Civil Action—1:13-cv-00001-MJG, "Declaration of Ahmed J. Davis in Support of Defendant Harland Clarke Corp.'s Opposition to EZShield, Inc.'s Motion to Dismiss Counterclaims & Strike Affirmative Defenses (Attachments: #1 Exhibit A, #2 Exhibit B, #3 Exhibit C, #4 Exhibit D, #5 Exhibit E)," Filed Mar. 8, 2013, 151 pages.
Civil Action—1:13-cv-00001-MJG, "Notice of Harland Clarke Corp.'s Corrected Opposition to EZShield, Inc.'s Motion to Dismiss Counterclaims & Strike Affirmative Defenses (Attachments: #1 Exhibit A)," Filed Mar. 12, 2013, 40 pages.
Civil Action—1:13-cv-00001-MJG, "Declaration of Ahmed J. Davis in Support of Defendant Harland Clarke Corp.'s Opposition to EZShield, Inc.'s Motion to Dismiss Counterclaims & Strike Affirmative Defenses: Exhibit A," Filed Mar. 8, 2013, pp. 19-92.
EZShieldTM Check Fraud Protection Program: Home, http://www.ershield.org, printed Apr. 24, 2002, 1 page.
EZShieldTM Check Fraud Protection Program: Coverage Limits, Scope of Recoverable Losses, General Rules, Term, and Conditions, http://www.ezshield.org/cover.html, printed Apr. 24, 2002, 1 page.
EZShieldTM Check Fraud Protection Program: Claim Forms, http://www.ezshield.org/claims.html, printed Apr. 24, 2002, 1 page.
EZShieldTM Check Fraud Protection Program: Privacy Policy for EZShield Check Fraud Protection Program, http://www.ezshield.org/privacy.html, printed Apr. 24, 2002, 1 page.
EZShieldTM Check Fraud Protection Program: Contact Us, http://www.ezshield.org/contact.html, printed Apr. 24, 2002, 1 page.
Let Freedom Wave with Check Gallery, The Check Gallery, printed Apr. 23, 2002, 1 page.
Office Action in U.S. Appl. No. 13/720,921, mailed Jun. 24, 2015.
Office Action in U.S. Appl. No. 13/720,950, mailed Sep. 11, 2015.
Office Action in U.S. Appl. No. 13/841,693, mailed Aug. 10, 2015.
Office Action in U.S. Appl. No. 13/720,921, mailed May 25, 2016.
Office Action in U.S. Appl. No. 13/720,950, mailed Apr. 15, 2016.
Office Action in U.S. Appl. No. 13/841,693, mailed May 5, 2016.
Office Action in U.S. Appl. No. 13/720,950, mailed Jan. 27, 2017.
Office Action in U.S. Appl. No. 13/841,693, mailed Dec. 23, 2016.

EZSHIELD CHECK FRAUD PROTECTION PROGRAM℠ (patent pending)
REIMBURSEMENT REQUEST FORM

Please complete the following form completely and return with all requested attachments to the address set forth below. If there are multiple account holders, each account holder must be listed and must sign the forms below.

Name(s): _______________________________________________________________
Address: _______________________________________________________________
Daytime Phone: _________________________________________________________
Home Phone: ___________________________________________________________
E-Mail Address: _________________________________________________________
Describe nature of fraud: _________________________________________________
_______________________________________________________________________

Date Loss Incurred: _____________________________________________________
Date Loss Discovered: ___________________________________________________
Involved Check Number(s): _______________________________________________
Has the bank been contacted?  ☐ Yes  ☐ No
Has a police report been prepared?  ☐ Yes  ☐ No
Please attach a copy and/or provide the police report number: ______________
Location of loss: _______________________________________________________
Did the loss involve a family member?  ☐ Yes  ☐ No
Did the loss involve a resident of your household?  ☐ Yes  ☐ No
Describe damages claimed: _______________________________________________
_______________________________________________________________________

UNDER THE PENALTIES OF PERJURY THE ABOVE INFORMATION IS TRUE AND CORRECT TO THE BEST OF MY AND/OR OUR KNOWLEDGE AND BELIEF.

_______________________________
Signature

_______________________________
Name Printed

_______________________________
Signature

_______________________________
Name Printed

Please complete the attached Limited Durable Power of Attorney form and attach any and all documents related to the loss, including the original check upon which the claim is based, police reports or any other documentation related to the loss.

Figure 3

LIMITED DURABLE POWER OF ATTORNEY FORM

NOTICE: READ OVER THE FOLLOWING DOCUMENT CAREFULLY. LEGAL POWERS ARE GRANTED BY THIS DOCUMENT. IF THERE IS ANYTHING YOU DO NOT UNDERSTAND OR IF YOU HAVE QUESTIONS ABOUT THIS DOCUMENT, YOU SHOULD ASK A LAWYER TO EXPLAIN IT TO YOU. YOU MAY REVOKE THIS LIMITED DURABLE POWER OF ATTORNEY IF YOU LATER WISH TO DO SO.

I, _____________________________ [name], of _____________________________ [street address] _____________ [city] _____________ [county] _____________ [state], being of sound mind, do hereby voluntarily appoint CUSTOM DIRECT, INC., a corporation duly incorporated in the State of Delaware, with the business address of 1802 Fashion Court, Joppa, Harford County, Maryland, as my true and lawful attorney-in-fact, for me and in my name, place and stead, and for my use and benefit to, in its sole discretion, transact, handle and dispose of the following limited matters: to demand, sue for, recover, collect, and receive all sums of money, debts, accounts and demands that are now or shall hereafter become due, owing, payable, or belonging to me and have, use, and take all lawful means for the recovery thereof, and to compromise and give discharges for the same limited to the fraud related to my bank account with _____________ (hereinafter referred to as "my Bank") and more specifically, check number(s) _____________ written on bank account number _____________ (hereinafter referred to as "the Fraud").

I understand that my attorney-in-fact and my Bank may rely on this Limited Durable Power of Attorney. I understand that revocation of this Limited Durable Power of Attorney will not be effective until my attorney-in-fact and my Bank learn of my revocation. I agree to indemnify my Bank for any claims that arise out of its reliance on this Limited Durable Power of Attorney.

I hereby give and grant unto said attorney-in-fact limited power and authority to do and perform every act and thing necessary, to be done in and about relative to the Fraud as fully as I might or could do if personally present. All power and authority granted herein shall not be affected by my later disability, incapacity, adjudged incompetency or passage of time, except as otherwise provided by statute. This Limited Durable Power of Attorney shall be nondelegable and shall be exercisable and valid for as long as and until the earlier of when the Fraud is resolved or when this Limited Durable Power of Attorney is revoked. This Limited Durable Power of Attorney shall be effective immediately and shall continue until the earlier of when the Fraud is resolved or when this Limited Durable Power of Attorney is specifically revoked. I declare any act or thing lawfully done by my attorney-in-fact by virtue of this Limited Durable Power of Attorney shall be binding on myself, my heirs, my legal and personal representatives and my assigns.

NOTICE TO THIRD PARTIES

A third party who relies on the reasonable representations of my attorney-in-fact as to a matter relating to a power granted by this executed Limited Durable Power of Attorney will not incur any liability to me or to my heirs, assigns or estate as a result of permitting the attorney-in-fact to exercise the authority granted by this Limited Durable Power of Attorney. A third party who fails to honor this executed Limited Durable Power of Attorney may be liable to me, my attorney-in-fact, my heirs, assigns or estate for a civil penalty, plus damages, costs and fees associated with the failure to comply with this Limited Durable Power of Attorney.

SUBROGATION AND ASSIGNMENT

In further consideration of this Limited Durable Power of Attorney, I hereby agree to assign any and all claims that I have of any kind against any and all parties who may be responsible for the Fraud. I further agree to cooperate in any manner deemed necessary in any efforts to recover any amounts paid to me by Custom Direct, Inc. from third parties who may be responsible for damages or losses related to the Fraud. I specifically agree to provide any requested documentation to Custom Direct, Inc. and to cooperate in regard to any court proceeding or other action seeking to recover amounts paid and further to take no action to any way diminish, release or waive any claims against any party.

Figure 4a

(LIMITED DURABLE POWER OF ATTORNEY - Page 2)

WARNING! THIS IS AN IMPORTANT LEGAL DOCUMENT. DO NOT SIGN THIS DOCUMENT UNLESS YOU FULLY UNDERSTAND THE CONSEQUENCES OF HAVING A LIMITED DURABLE POWER OF ATTORNEY.

I/we, as the principal(s), sign my/our name(s) to this Limited Durable Power of Attorney this ____ day of ________, 20___ and, being first duly sworn, do declare to the undersigned authority that I/we sign and execute this instrument as my/our Limited Durable Power of Attorney and that I/we sign it willingly, that I/we execute it as my/our free and voluntary act for the limited purpose expressed in this Limited Durable Power of Attorney and that I/we am/are eighteen years of age or older, of sound mind and under no constraint or undue influence.

_________________________  _________________________
Signature of Principal           Social Security Number of Principal _________________________  _________________________
Signature of Joint Principal      Social Security Number of Joint Principal WE SIGN BELOW AS WITNESSES. WE ARE NOT RELATED TO THE PRINCIPAL(S) BY BLOOD, MARRIAGE OR ADOPTION. THIS DECLARATION WAS SIGNED IN OUR PRESENCE. THE GRANTOR(S) APPEAR(S) TO BE OF SOUND MIND AND TO BE MAKING THIS DESIGNATION VOLUNTARILY, WITHOUT DURESS, FRAUD OR UNDUE INFLUENCE. NEITHER OF US IS AN ATTORNEY-IN-FACT NAMED IN THE DOCUMENT.

_________________________  _________________________
Name of First Witness (PRINT)    Signature of First Witness (SIGN)

_________________________  _________________________
Name of Second Witness (PRINT)   Signature of Second Witness (SIGN)

ACKNOWLEDGMENT

State of________________________________

City/County of__________________________

Before me, a notary public in and for said City/County and State, personally appeared the above-named who acknowledged that he/she/they did sign the foregoing instrument and that the same is his/her/their free and voluntary act and deed.

In testimony whereof, I have hereunto set my hand and official seal this ____ day of _________, 20___.

_________________________
Notary Public

Commission No: _________________________

My Commission Expires: _________________________

---

Please send the Claim Form and Limited Durable Power of Attorney with all documents related to the claim to:
    EZShield™ Check Fraud Protection Program
    Attn: Risk Management Department
    1802 Fashion Court
    Joppa, Maryland 21085

Figure 4b

SYSTEM AND METHOD FOR PROVIDING RECOVERY FOR VICTIMS OF CHECK FRAUD

CROSS REFERENCE TO RELATED APPLICATION

This application is a continuation of U.S. patent application Ser. No. 11/328,362, filed with the U.S. Patent and Trademark Office on Jan. 9, 2006, which is a continuation-in-part of U.S. patent application Ser. No. 10/685,206, entitled "System and Method for Providing Recovery for Victims of Check Fraud", filed with the U.S. Patent and Trademark Office on Oct. 14, 2003, now U.S. Pat. No. 8,346,637, which is based upon and claims benefit of U.S. Provisional Patent Application Ser. No. 60/418,936 entitled "System and Method for Providing Check Fraud Protection", filed with the U.S. Patent and Trademark Office on Oct. 15, 2002, the entire disclosures of which are included herein by reference.

BACKGROUND OF THE INVENTION

Field of the Invention

The invention disclosed herein relates generally to the recovery of losses associated with unauthorized use of negotiable instruments, and more particularly to a fraud protection system and method for enabling an individual consumer or business to recover losses due to forged signatures, forged endorsements, or altered information on checks.

Background of the Prior Art

Attempted check fraud at commercial banks is a growing problem. Check fraud can be one of the most damaging financial frauds. A victim of check fraud can suffer not only loss of all their financial holdings, but damage to their credit report as well.

Check fraud is generally perpetrated in one of several manners, such as:
  FORGED SIGNATURES—legitimate blank checks with an imitation of the payer signature;
  FORGED ENDORSEMENTS—often involves the use of a stolen check, which is then endorsed and cashed or deposited by someone other than the payee;
  COUNTERFEIT CHECKS—due to the advancement in color copying and desktop publishing capabilities, this is the fastest-growing source of fraudulent checks today;
  ALTERED CHECKS—information on a legitimate check, such as payee or check amount, changed to benefit the perpetrator; and
  CHECK KITING—the process of depositing a check from one bank account into a second bank account without the sufficient funds to cover it.

According to the Federal Reserve Board, more than 500 million checks are forged annually, with losses totaling more than $10 billion.

According to the National Check Fraud Center, check fraud and counterfeiting are among the fastest-growing problems affecting the nation's financial system, producing estimated annual losses of $10 billion, and continues to rise annually at an alarming rate.

According to a report issued by the American Banker, an industry bankers' magazine, estimates of losses from check fraud will grow by 2.5% annually in the coming years.

Many processes and techniques have been developed to thwart the growing problem of check fraud. Special inks, microprinting, encryption of machine-readable code, and specially designed checkbooks to disclose loss of checks are some methods suggested to guard against check fraud. Even with the multitude of schemes to prevent incidents of check fraud, the continued growth indicates that most courses of action are ineffective in preventing such occurrence, such that businesses and consumers continue to lose significant funds through the ongoing check fraud ailment. Efforts must be directed to recovery of losses attributed to such check fraud.

Ordinarily, for a victim of check fraud to recover losses arising from such victimization, the victim must generally investigate the fraud on their own, report the fraud to their bank or financial institution to seek reimbursement, and initiate criminal and/or civil proceedings as appropriate, if necessary. Such steps are generally unfamiliar to the average person, and the apprehension of such tasks can present a barrier to entry.

Accordingly, there has been found to remain a need for a simple method for a victim of check fraud to recover from losses associated with specific forms of check fraud, such as forged signatures, forged endorsements, and alterations to legitimate checks.

SUMMARY OF THE INVENTION

It is, therefore, an object of the present invention to enable a process for recovering losses due to check fraud that avoids the disadvantages of the prior art.

It is another object of the present invention to enable a method by which a subscriber can recover losses due to specific modes of check fraud. A related object is to enable a method by which a subscriber can recover losses directly from a Check Fraud Protection service provider.

It is another object of the present invention to enable a method by which a subscriber can recover losses due to check fraud in the nature of forged signatures. It is another object of the present invention to enable a method by which a subscriber can recover losses due to check fraud in the nature of forged endorsements. It is yet another object of the present invention to enable a method by which a subscriber can recover losses due to check fraud in the nature of altered instruments.

Another object of the present invention is the provision of a reimbursement request form for reporting loss to the subscriber's Check Fraud Protection service provider.

Another object of the present invention is the provision of limited durable power of attorney by which a subscriber can assign any right of recovery arising from the fraud to the Check Fraud Protection service provider.

Another object of the present invention is the provision of a novel method for recovering losses arising from specific modes of check fraud.

In accordance with the above objects, a system and method for a subscriber to protect against loss associated with specified forms of check fraud are provided. Upon purchasing checks or at the time of subscription, a subscriber can, for an additional fee, subscribe to a check fraud protection program. The subscription will enable the subscriber to obtain reimbursement from the Check Fraud Protection service provider for the consumer's losses due to predetermined causes of check fraud. The subscriber reciprocally assigns any right of recovery from the subscriber's bank or financial institution to the Check Fraud Protection service provider, which can then seek reimbursement from the bank, or financial institution and institute proceedings against the fraud perpetrator.

BRIEF DESCRIPTION OF THE DRAWINGS

The above and other features, aspects, and advantages of the present invention are considered in more detail, in relation to the following description of embodiments thereof shown in the accompanying drawings, in which:

FIGS. 4a and 4b is a durable power of attorney for use in a preferred embodiment of the present invention.

DETAILED DESCRIPTION OF THE INVENTION

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
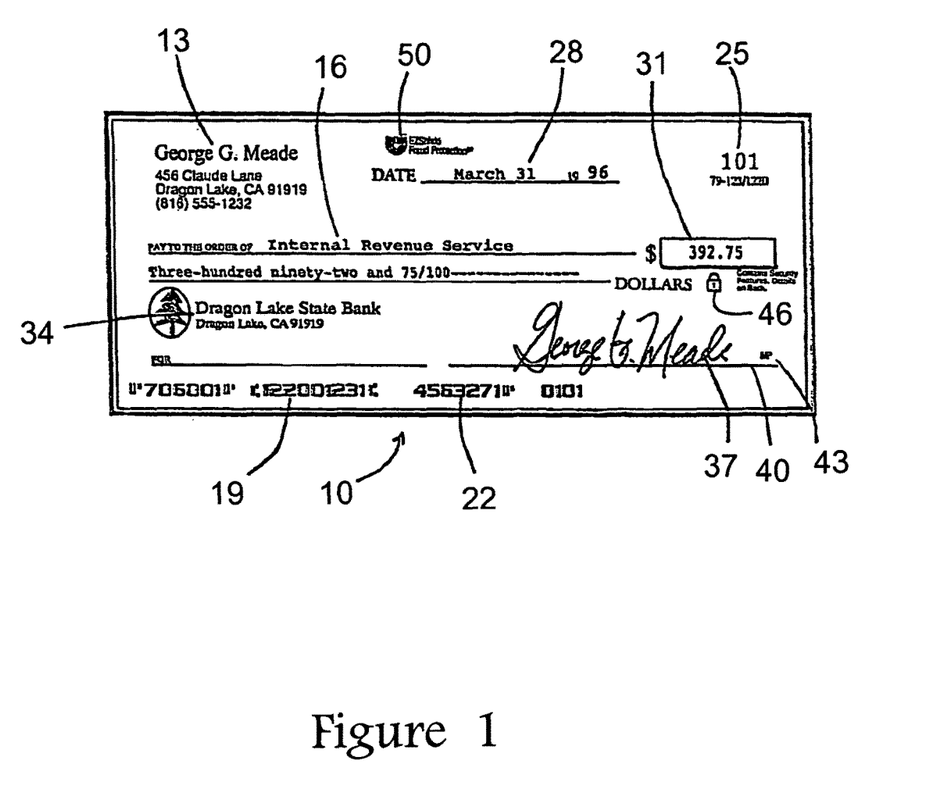
FIG. 1 is an illustration of a check for describing features of the present invention.

FIG. 1 shows a view of the face of a prepared check, indicated generally as 10. On the face of the check are the following data items: the name and address of the account holder 13; the name of the payee 16; the issuing bank number with routing number 19; the checking account number 22; a check number 25; the check date 28; the check amount 31; the name of the issuing bank 34; and the signature of the payer 37.

Indication of some security features may also be seen on the face of the check 10. For example, it is common to use microprinting to create the signature line 40. Such microprinting appears as a dotted line when photocopied. The stylized MP symbol 43 indicates the presence of microprinting. The padlock symbol 46 is a certification mark indicating that the check 10 contains certain security features.

Pursuant to one feature of a preferred embodiment of the instant invention, additional indicia 50 may be provided on the face of the check indicating that the particular check 10 is protected by a check fraud protection program as disclosed herein. As explained in greater detail below, while a series of checks 10 having consecutive check numbers is issued to an account holder, it is intended that all checks in such series according to the instant invention bear such indicia 50, and thus that the check fraud protection program disclosed herein applies check fraud protection to every one of the checks in such series.

It is not necessary, however, that a check has such indicia 50 in order to be eligible for check fraud protection according to the present invention. A subscriber can enroll checks in the check fraud protection program and identify the existing checks to be covered. Those checks will not have the indicia 50 thereon. Upon purchasing a subsequent order of check, the indicia 50 may be printed on the face of all the checks in such subsequent order.

Figure 2:
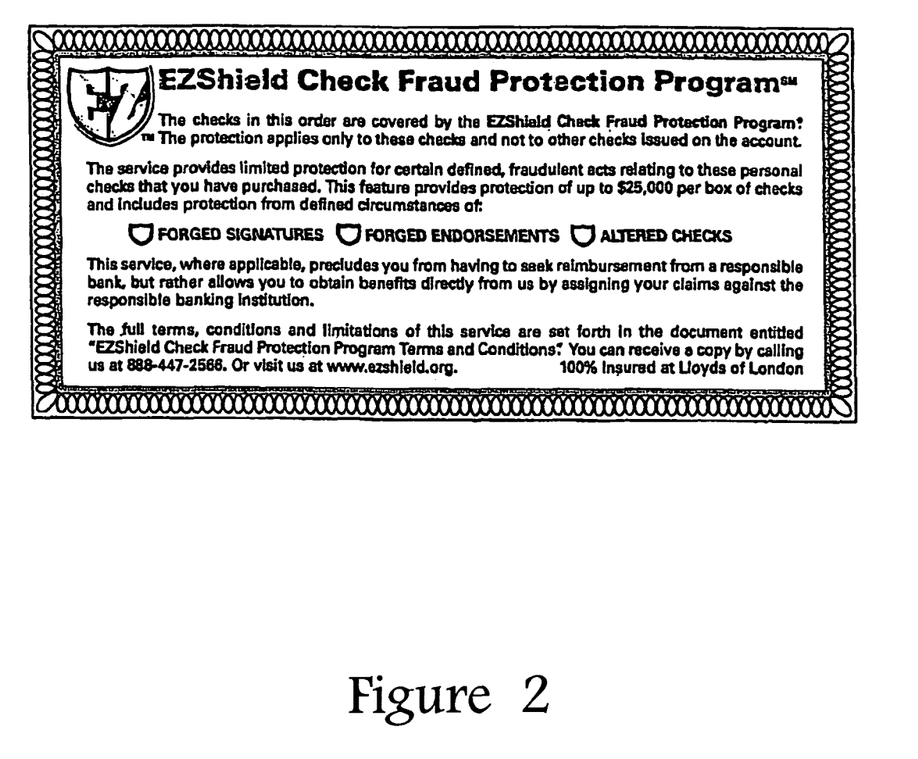
FIG. 2 is an illustration of an insert accompanying checks purchased under an embodiment of the present invention.
Figure 3:
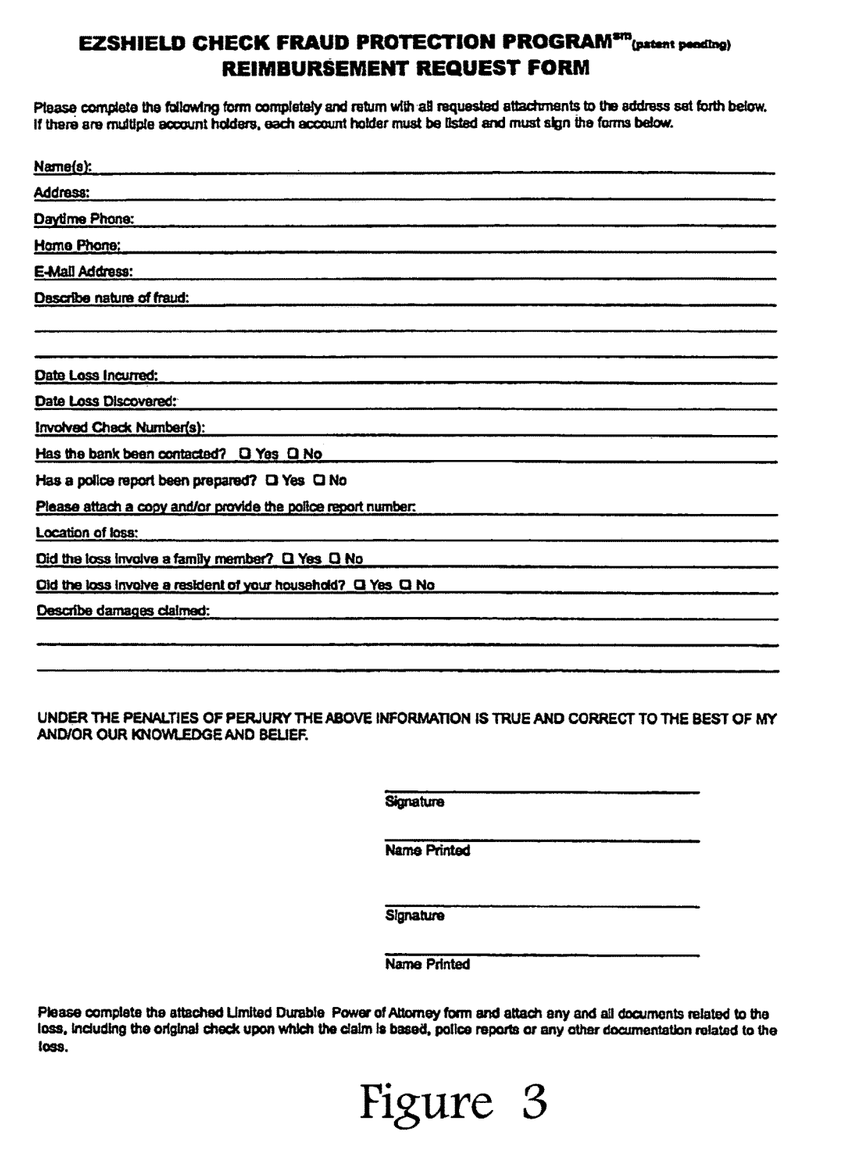
FIG. 3 is a reimbursement request form for use in a preferred embodiment of the present invention.

In operation, the system of the present invention operates as follows:

a. An individual consumer or business subscribes to a check fraud protection program to cover certain instances of check fraud. If the subscriber already has printed checks, then the numbers of the existing checks should be reported to the Check Fraud Protection service provider for enrollment in the check fraud protection program. The subscription will last for a predetermined period of time.

b. Upon ordering a first or subsequent box of checks from a check printing source the subscriber provides to the check printer the appropriate information to be printed on the check, such as the name and address of the account holder 13; the issuing bank number with routing number 19; the name of the issuing bank 34 and checking account number 22; and a beginning check number 25 for the box of checks.

c. If the subscriber has not previously enrolled the numbers of existing checks in the check fraud protection program, then during the ordering process, the subscriber may subscribe to a check fraud protection program for all the checks in the box.

d. Upon subscription, the check printer adds an indicia, such as 50 to every check printed in the box. If the consumer or business wishes to subscribe to the service after they have placed their check order, the check printer will add the indicia on subsequent check orders. For newly printed checks, the check printer/service provider records the range of numbers of the checks in the box. Typically, a box contains between one hundred (100) and two hundred (200) checks. The check printer sends the box of printed checks to the consumer and includes an insert, such as illustrated in FIG. 2, informing the consumer that the checks in the box are included under the check fraud protection plan.

e. Upon the occurrence of an identified check fraud event (as described in greater detail below) against any of the checks in the box, the subscriber reports the occurrence to the Check Fraud Protection service provider using a reimbursement request form to obtain reimbursement directly from the service provider. An exemplary reimbursement request form is illustrated in FIG. 3. The subscriber also provides the Check Fraud Protection service provider a power of attorney, including an assignment of the right of recovery by the subscriber, to enable the service provider to pursue an appropriate action against the responsible banking or financial institution. An exemplary power of attorney form is illustrated in FIG. 4. In addition to such reimbursement request form, a police report and/or other proof of fraud is required.

f. Upon notification of such reimbursement request, the Check Fraud Protection service provider directs the check printer to print a new box of checks which, when properly executed by the authorized account holder, will draw funds from a new account that receives the account holder's funds after the original, compromised account is closed.

Check fraud events for which reimbursement may be requested preferably include:

Forged Signatures: protection applies to legitimate blank checks that are forged with an authorized signature 37 (FIG. 1), as the payer, and that results in a debit to the checking account.

Forged Endorsements: protection applies to a legitimate check that is endorsed and cashed or deposited by someone other than the designated payee 16 (FIG. 1) based upon a fraudulent and false endorsement. Such protection, however, does not apply to a check that bears a legitimate original endorsement that is secondarily fraudulently endorsed.

Altered Checks: protection applies to legitimate checks that contain altered information such as payee identification 16, check amount 31, or other alteration to benefit the party altering the check.

Checks employed by the system and method of the invention described herein preferably include: (i) Check Fraud Protection purchased at the time the original checks are purchased and includes only those checks within a range of numbers purchased in the order at the time of the check fraud protection subscription. Such checks should be printed with an indicia 50 indicating that the checks are, in fact, secured by the check fraud protection program described herein; or (ii) Check Fraud Protection purchased after an initial check order are protected provided that they were printed by the Check Fraud Protection Service Provider's endorsed vendor and are covered for a period of time specified by the Service Provider in months. For accuracy, the Service Provider maintains a database record of all pertinent information.

The check fraud protection program described herein is not an insurance policy although a commercial insurance provider may insure the organization providing such fraud protection. The fraud protection program is designed to facilitate the subscriber's recovery of losses arising from identified check fraud events, such that the subscriber obtains benefits directly from the Check Fraud Protection service provider by assigning any claims against the responsible banking/financial institution to the service provider. Accordingly, the subscriber obtaining such fraud protection need not and should not seek any reimbursement from the responsible banking/financial institution.

The protection may be limited, such as to a maximum of $25,000.00 per order of checks, regardless of the number of checks for which reimbursement requests are presented and/or the number of requests made. For subscriptions taken out after checks have been printed, the protection may be limited to only individually identified check numbers and may be limited to a predetermined period of time, such as a number of months. Protection may apply to personal or business checks purchased according to the program. Such protection does not apply to deposit tickets and checks not included in a box of checks for which a subscription was purchased, even if such checks were also purchased from the same check printer. Protection does not apply to checks printed by a vendor other than by the Check Fraud Protection Service Provider's endorsed vendor. Furthermore, protection may be limited to only frauds committed in the country where the consumer is a resident.

Only designated losses are reimbursable pursuant to the check fraud protection program. The amount reimbursable includes all actual amounts paid from the subscriber's account and all bank/financial institution/retailer fees arising from the fraud, not to exceed the limits of such check fraud protection program.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method for providing recovery for victims of check fraud, comprising:
    by a system having an electronic database, a Check Fraud Protection service provider receiving subscriptions from one or more subscribers for a check fraud protection service;
    said subscription identifying and recording in a record of the database, a checking account and a sequence of numbered checks to be covered by said check fraud protection service;
    said Check Fraud Protection service provider electronically receiving from the subscriber a notification of an occurrence of check fraud against a check within a range of numbers of the checks in such sequence of numbered checks;
    said Check Fraud Protection service provider providing to the subscriber at least a portion of the amount of money paid from the subscriber's checking account arising from the check fraud; and
    said Check Fraud Protection service provider pursuing recovery for the check fraud; and
    upon the Check Fraud Protection service electronically receiving notification of the occurrence of check fraud, directing, by the Check Fraud Protection service, a check printer to print a new series of checks for a new checking account that receives the subscriber's funds after the compromised checking account is closed.

2. The method of claim 1, wherein the receiving from the subscriber the notification of the occurrence of check fraud includes receiving a notification of check fraud including at least one of:
    a legitimate blank check that is forged with an authorized signature;
    a legitimate check that is endorsed and presented by other than a designated payee based upon a fraudulent endorsement; and
    a legitimate check that is altered to benefit an altering party.

3. The method of claim 1, wherein the subscription identifies a sequence of numbered checks from a pre-existing box of checks, said subscription being for a term of months.

4. The method of claim 3, wherein the checks from said pre-existing box of checks have been printed by a Check Fraud Protection service provider approved vendor.

5. The method of claim 1, wherein the subscription identifies a sequence of numbered checks for a new order of checks, said method further comprising:

receiving from said subscriber an order for printing a series of checks for the checking account, wherein the order includes an order for check fraud protection;

providing checks according to the order; and recording the range of numbers of the checks in such order.

6. The method of claim 5, wherein the step of providing checks further comprises the step of printing indicia upon each check to signify that such check is enrolled in the check fraud protection program.

7. The method of claim 6, further comprising:

verifying enrollment in said check fraud protection service based upon indicia upon the check, and the reimbursing is performed after a positive verification.

8. The method of claim 1, wherein the step of receiving notification of the occurrence of check fraud further comprises receiving documented proof of such fraud.

9. The method of claim 8, wherein such documented proof of such fraud comprises a police report.

10. The method of claim 1, further comprising the Check Fraud Protection service provider receiving a right to pursue recovery for such check fraud further comprises receiving an assignment of the right of recovery by the subscriber.

11. The method of claim 1, wherein the one or more subscribers is an individual customer.

12. The method of claim 1, wherein the one or more subscribers is a business.

13. The method of claim 1, wherein the checking account comprises a personal or a business checking account.

14. The method of claim 1, wherein the Check Fraud Protection Service provider receives a right of recovery by the subscriber against a financial institution upon which the check is drawn.

15. A method for providing recovery for victims of check fraud, comprising the steps of:

by a system having an electronic database, establishing a Check Fraud Protection service provider to receive subscriptions for a check fraud protection service;

said Check Fraud Protection service provider receiving a subscription for said check fraud protection service, said subscription identifying and recording in a record in the database, a checking account and a sequence of numbered checks to be covered by said check fraud protection service;

said Check Fraud Protection service provider electronically receiving from the subscriber a notification of an occurrence of check fraud against a check within the a range of numbers of the checks in such sequence of numbered checks;

said Check Fraud Protection service provider providing to the subscriber at least a portion of the amount of money paid from the subscriber's checking account arising from the check fraud; and upon the Check Fraud Protection service electronically receiving notification of the occurrence of check fraud, directing, by the Check Fraud Protection service, a check printer to print a new series of checks for a new checking account that receives the subscriber's funds after the compromised checking account is closed.

16. A system for providing recovery for victims of check fraud, comprising:

an electronic database; and one or more processors configured to:

receive subscriptions from one or more subscribers for a check fraud protection service; each of said subscription identifying and recording in a record of the database, a checking account and a sequence of numbered checks to be covered by said check fraud protection service;

receive from the subscriber a notification of an occurrence of check fraud against a check within a range of numbers of the checks in such sequence of numbered checks;

provide to the subscriber at least a portion of the amount of money paid from the subscriber's checking account arising from the check fraud; and upon receiving notification of the occurrence of check fraud, directing, a check printer to print a new series of checks for a new checking account that receives the subscriber's funds after the compromised checking account is closed.

17. The system of claim 16, wherein the check fraud is selected from the group consisting of:

a legitimate blank check that is forged with an authorized signature;

a counterfeit check;

a legitimate check that is endorsed and presented by other than a designated payee based upon a fraudulent endorsement; and a legitimate check that is altered to benefit an altering party.

18. The system of claim 16, wherein the system is further configured to print indicia upon each check to signify a check fraud protection program.

19. The system of claim 16, wherein the system is further configured to receive documented proof of the check fraud.

20. The system of claim 19, wherein the documented proof of the check fraud comprises a police report.

21. The system of claim 16, wherein the system is further configured to receive an assignment of a right of recovery by the subscriber.

22. The system of claim 16, the system further configured to receive, from the subscriber, an assignment of a right of recovery against a financial institution upon which the check is drawn.

23. The system of claim 22, the system further configured to obtain a written limited power of attorney from the subscriber to pursue recovery from the financial institution.

* * * * *